United States Patent
Deng et al.

(10) Patent No.: US 9,708,545 B2
(45) Date of Patent: Jul. 18, 2017

(54) METHOD FOR CONVERTING CARBON AND HYDROCARBON CRACKING AND APPARATUS FOR HYDROCARBON CRACKING

(71) Applicant: General Electric Company, Schenectady, NY (US)

(72) Inventors: Zhigang Deng, Shanghai (CN); Wenqing Peng, Shanghai (CN); Chuan Lin, Shanghai (CN); Shizhong Wang, Shanghai (CN); Qijia Fu, Shanghai (CN); Yanfei Gu, Shanghai (CN); Zhaoping Wu, Shanghai (CN); Yangang Liang, Shanghai (CN); Minggang She, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 128 days.

(21) Appl. No.: 14/740,651

(22) Filed: Jun. 16, 2015

(65) Prior Publication Data

US 2015/0284639 A1 Oct. 8, 2015

Related U.S. Application Data

(62) Division of application No. 13/101,171, filed on May 5, 2011, now Pat. No. 9,074,147.

(30) Foreign Application Priority Data

Jun. 28, 2010 (CN) .......................... 2010 1 0212803

(51) Int. Cl.
*C10G 9/00* (2006.01)
*B01J 19/24* (2006.01)
(Continued)

(52) U.S. Cl.
CPC ................ *C10G 9/00* (2013.01); *B01J 19/24* (2013.01); *C01B 31/18* (2013.01); *C01B 31/20* (2013.01);
(Continued)

(58) Field of Classification Search
CPC . C10G 9/00; C10G 75/00; B01J 19/24; C01B 31/18; C01B 31/20; C01G 9/12; C01G 9/36
(Continued)

(56) References Cited

U.S. PATENT DOCUMENTS

| | | | |
|---|---|---|---|
| 2,882,244 A | * | 4/1959 | Milton ..................... B01J 20/18 208/2 |
| 3,733,186 A | | 5/1973 | Zemaitis |

(Continued)

FOREIGN PATENT DOCUMENTS

| | | |
|---|---|---|
| CN | 1958731 A | 5/2007 |
| EP | 0178168 B1 | 1/1990 |

(Continued)

OTHER PUBLICATIONS

Kubo et al., "Inverted Phase Relation in the Formation of Nepheline and Carnegieite from the System Kaoline-Sodium Carbonate", The American Mineralogist, vol. No. 51, pp. 516-521, 1966.
(Continued)

*Primary Examiner* — Walter D Griffin
*Assistant Examiner* — Huy-Tram Nguyen
(74) *Attorney, Agent, or Firm* — GE Global Patent Operation

(57) ABSTRACT

A method for converting carbon into a carbon oxide, comprises: contacting carbon with steam in presence of a carnegieite-like material of formula $(Na_2O)_x Na_2[Al_2Si_2O_8]$,
(Continued)

wherein 0<x≤1. Method and apparatus for hydrocarbon cracking are also described herein.

6 Claims, 2 Drawing Sheets

(51) Int. Cl.

| | | |
|---|---|---|
| *C01B 31/18* | (2006.01) | |
| *C01B 31/20* | (2006.01) | |
| *C10G 9/12* | (2006.01) | |
| *C10G 9/36* | (2006.01) | |
| *C10G 75/00* | (2006.01) | |

(52) U.S. Cl.
CPC .............. *C10G 9/12* (2013.01); *C10G 9/36* (2013.01); *C10G 75/00* (2013.01); *B01J 2219/00245* (2013.01); *B01J 2219/24* (2013.01); *C10G 2300/1044* (2013.01); *C10G 2300/1059* (2013.01); *C10G 2300/1081* (2013.01); *C10G 2300/807* (2013.01); *C10G 2400/20* (2013.01)

(58) Field of Classification Search
USPC ........................................................ 422/241
See application file for complete search history.

(56) References Cited

U.S. PATENT DOCUMENTS

| | | | |
|---|---|---|---|
| 3,753,929 A * | 8/1973 | Lindsley | ................ B01J 29/084 502/65 |
| 4,211,669 A | 7/1980 | Eakman et al. | |
| 4,224,108 A | 9/1980 | Takahashi et al. | |
| 4,265,735 A | 5/1981 | Audeh et al. | |
| 4,341,622 A | 7/1982 | Tabak et al. | |
| 4,409,092 A | 10/1983 | Johnson et al. | |
| 4,554,260 A | 11/1985 | Pieters et al. | |
| 4,638,106 A | 1/1987 | Pieters et al. | |
| 4,740,527 A | 4/1988 | Von Bonin | |
| 4,772,378 A | 9/1988 | Miyauchi et al. | |
| 4,786,625 A | 11/1988 | Imai et al. | |
| 4,827,072 A | 5/1989 | Imai et al. | |
| 4,880,764 A | 11/1989 | Imai et al. | |
| 4,910,006 A | 3/1990 | Zones et al. | |
| 4,940,529 A | 7/1990 | Beaton et al. | |
| 4,973,779 A | 11/1990 | Imai et al. | |
| 6,720,171 B2 * | 4/2004 | Schunk | ................ B01J 19/0046 435/168 |
| 7,435,332 B2 | 10/2008 | Long et al. | |
| 2005/0197518 A1 * | 9/2005 | Miller | ..................... C07C 6/126 585/475 |
| 2009/0166259 A1 | 7/2009 | Bradley et al. | |
| 2010/0236983 A1 * | 9/2010 | Watanabe | ................ B01J 29/06 208/120.15 |

FOREIGN PATENT DOCUMENTS

| | | |
|---|---|---|
| SU | 965360 A3 | 10/1982 |
| WO | 8204061 A1 | 11/1982 |
| WO | 8204063 A1 | 11/1982 |

OTHER PUBLICATIONS

Klingenberg et al., "Interstitial Cristobalite-Type Compounds (Na2O)=<0.33[AlSiO4]", Solid State Chemistry, vol. No. 61, Issue No. 01, pp. 40-46, Jan. 1, 1986.

Kosminski et al., "Reactions Between Sodium and Kaolin During Gasification of a Low-Rank Coal", Fuel Processing Technology, vol. No. 87, pp. 1051-1062, 2006.

Kuang et al., "Catalytic Mechanism of Sodium Compounds in Black Liquor During Gasification of Coal Black Liquor Slurry", Energy Conversion and Management, vol. No. 49, pp. 247-256, 2008.

PCT Search Report and Written Opinion issued in connection with corresponding PCT Application No. PCT/US2011/037288 on Aug. 24, 2011.

Chinese Office Action issued in connection with corresponding CN Application No. 201010212803.5 on Aug. 8, 2012.

GC Search and Examination Report issued in connection with corresponding GC Application No. 2011018675 on Jun. 3, 2014.

Russian Notice of Allowance issued in connection with corresponding RU Application No. 2012152275/04 on Sep. 10, 2015.

* cited by examiner

METHOD FOR CONVERTING CARBON AND HYDROCARBON CRACKING AND APPARATUS FOR HYDROCARBON CRACKING

This application is a divisional of prior U.S. patent application Ser. No. 13/101,171, which was filed on May 5, 2011. The entire subject matter of U.S. patent application Ser. No. 13/101,171, is incorporated by reference herein in its entirety.

BACKGROUND

The invention relates generally to methods for converting carbon and hydrocarbon cracking and apparatuses for hydrocarbon cracking. More specifically, the invention relates to methods for converting carbon into carbon oxide, and methods and apparatuses for hydrocarbon cracking, in which the build-up of coke deposits are undesirable.

In the petrochemical industry, hydrocarbons such as ethane, propane, butane, heptane, liquid petroleum gas, naphtha, and gas oil are cracked in apparatuses, in the presence of from about 30 weight percentage to about 70 weight percentage of steam, at temperatures of from about 700° C. to about 870° C. in order to produce light olefins such as ethylene and propylene. Sometimes, hydrocarbons such as bottoms from atmospheric and vacuum distillation of crude oil are cracked in apparatuses at a temperature in a range from about 480° C. to about 600° C. in the presence of about 1 wt % to about 2 wt % steam.

During hydrocarbon cracking processes, the build-up of carbonaceous deposits (i.e. coke deposits) usually happens on contact surfaces of apparatus components, for instance, inner radiant tube surfaces of furnace equipment. The inner radiant tube surfaces become gradually coated with a layer of coke which raises the radiant tube metal temperature (TMT) and increases the temperature drop through radiant coils. In addition, coke build-up adversely affects the physical characteristics of the apparatus components, such as the radiant tubes, by deteriorating mechanical properties such as stress rupture, thermal fatigue, and ductility.

In order to decoke apparatus components, the apparatus must be periodically shut down. Typically, the decoking is carried out by combustion of the coke deposits with steam/air at temperatures of up to 1000° C. Such decoking operations are required approximately every 10 to 80 days, depending on the operation mode, types of hydrocarbons, and result in production loss since hydrocarbons feeding must be stopped for such decoking operation.

A variety of methods have been considered in order to overcome the disadvantages of coke build-up on apparatus components, such as furnace tube inner surfaces. These approaches include: e.g., catalytic gasification of coke to produce carbon oxide ($CO/CO_2$) and hydrogen. However, till now people are still seeking an effective method for the gasification of coke, i.e., converting carbon into a carbon oxide (CO and/or $CO_2$).

Therefore, it is desirable to provide a method for converting carbon into carbon oxide and a method and an apparatus for hydrocarbon cracking, in which the build-up of coke deposits is effectively reduced/mitigated.

Carnegieite is the high-temperature form of $Na[AlSiO_4]$-nepheline, which can be prepared by annealing nepheline beyond 1530 K (1256.85° C.) with subsequent quenching to room temperature. Intercalation of sodium oxide into $Na[AlSiO_4]$-carnegieite to obtain compounds $(Na_2O)_{\leq 0.33}Na[AlSiO_4]$ has been reported in an article titled as Interstitial Cristobalite-type Compounds $(Na_2O)_{\leq 0.33}Na[AlSiO_4]$ and published in JOURNAL OF SOLID STATE CHEMISTRY 61, 40-46 (1986). $Na_8Al_4Si_4O_{18}$ has also been reported in Beitrage zur Beaktionsfahigkeit der silicate bei niedrigen temperaturen, II. Mitteilung., Die Strukturen $Na_2O$-reicher carnegieite., Von Werner Borchert and Jurgen Keidel, Heidelberg, Mit 6 Textabbildungen, (Eingegangen am 17, Marz 1947). However, there seems no or few, if any, reports about how to use this kind of $Na_2O$ intercalated or rich carnegieite-like materials.

BRIEF DESCRIPTION

In one aspect, the invention relates to a method for converting carbon into a carbon oxide, comprising: contacting carbon with steam in presence of a carnegieite-like material of formula $(Na_2O)_xNa_2[Al_2Si_2O_8]$, wherein $0<x\leq 1$.

In another aspect, the invention relates to a method for hydrocarbon-cracking, comprising: contacting at least one hydrocarbon with steam in an apparatus having a contact surface accessible to the at least one hydrocarbon, the contact surface comprising a carnegieite-like material of formula $(Na_2O)_xNa_2[Al_2Si_2O_8]$, wherein $0<x\leq 1$.

In yet another aspect, the invention relates to an apparatus for hydrocarbon-cracking having a contact surface accessible to at least one hydrocarbon, the contact surface comprising a carnegieite-like material of formula $(Na_2O)_xNa_2[Al_2Si_2O_8]$, wherein $0<x\leq 1$.

DRAWINGS

These and other features, aspects, and advantages of the present invention will become better understood when the following detailed description is read with reference to the accompanying drawings, wherein:

FIG. 1 shows the weight reduction percentages of the carbon black in the sample 1 and sample 2 after the sample 1 and the sample 2 were exposed to the helium-steam mixture compared with before exposure at different temperatures;

DETAILED DESCRIPTION

In one aspect, the invention relates to a method for converting carbon into a carbon oxide, comprising: contacting carbon with steam in presence of a carnegieite-like material of formula $(Na_2O)_xNa_2[Al_2Si_2O_8]$, wherein $0<x\leq 1$.

In some embodiments, the contacting occurs at a temperature in a range from about 400° C. to about 1000° C., or preferably from about 450° C. to about 950° C., or from about 500° C. to about 950° C., or preferably from about 750° C. to about 950° C. The carbon oxide comprises carbon dioxide and/or carbon monoxide.

In another aspect, the invention relates to a method for hydrocarbon-cracking, comprising: contacting at least one hydrocarbon with steam in an apparatus having a contact surface accessible to the at least one hydrocarbon, the contact surface comprising a carnegieite-like material of formula $(Na_2O)_xNa_2[Al_2Si_2O_8]$, wherein $0<x\leq 1$.

In some embodiments, the contacting occurs at a temperature in a range from about 500° C. to about 870° C., or preferably from about 800° C. to about 860° C. The at least one hydrocarbon comprises at least one of ethane, propane, butane, heptane, liquid petroleum gas, naphtha, and gas oil.

In yet another aspect, the invention relates to an apparatus for hydrocarbon-cracking having a contact surface accessible to at least one hydrocarbon, the contact surface comprising a carnegieite-like material of formula $(Na_2O)_xNa_2[Al_2Si_2O_8]$, wherein $0<x\leq1$.

In some embodiments, the carnegieite-like material is coated to the contact surface.

In some embodiments, the contact surface comprises a coating of carnegieite-like $Na_4Al_2Si_2O_9$.

The carnegieite-like material coating may be applied using different methods, for example, air plasma spray, slurry coating, sol-gel coating, and solution coating. In some embodiments, the carnegieite material is coated using slurry coating method.

The apparatus may be any apparatus in which hydrocarbon is cracked. In some embodiments, the apparatus comprises at least one of a furnace tube, a tube fitting, a reaction vessel, and a radiant tube.

Figure 3:
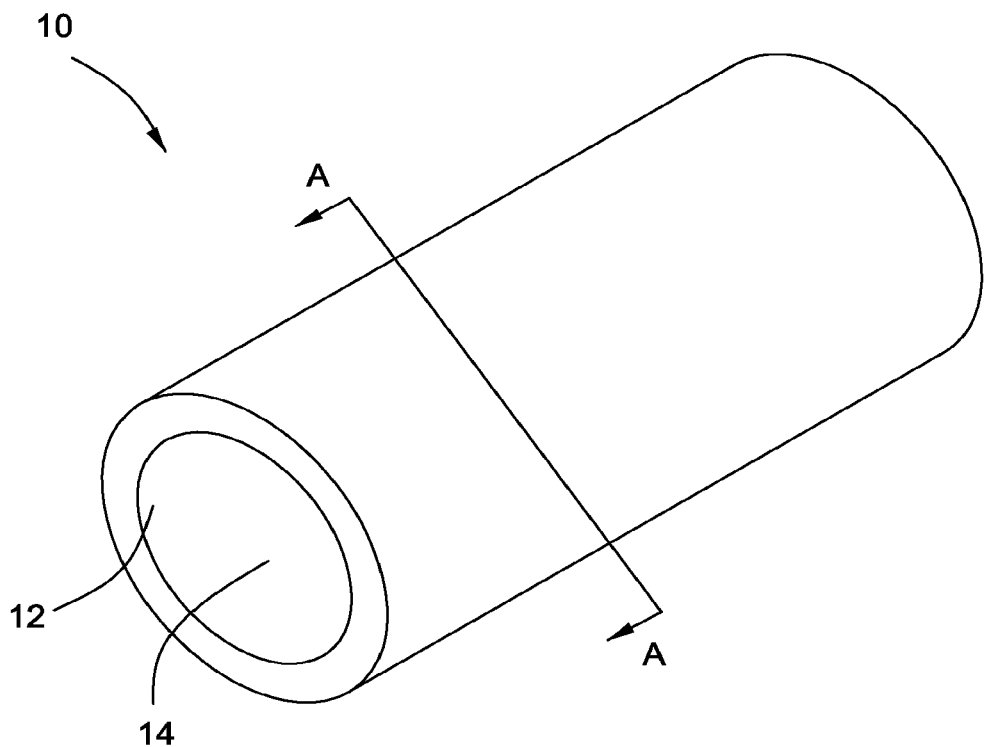
FIG. 3 shows a part of a furnace tube in accordance with one embodiment of the present invention.
Figure 4:
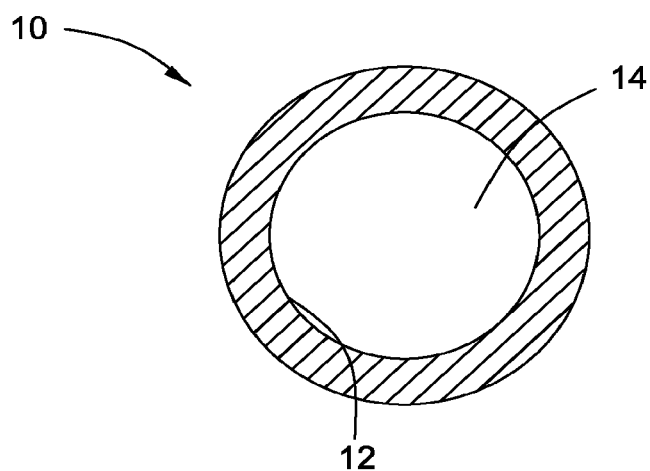
FIG. 4 shows a cross-sectional view taken along line A-A of FIG. 3.

Please refer to FIG. 3 and FIG. 4, a furnace tube 10 in accordance with one embodiment of the invention comprises a contact surface 12 accessible to at least one hydrocarbon (not shown) flowing through the cavity 14 thereof.

In some embodiments, the carnegieite-like material is of formula $Na_4Al_2Si_2O_9$.

In some embodiments, the carnegieite-like material is a mixture of materials of formula $(Na_2O)_xNa_2[Al_2Si_2O_8]$.

DEFINITIONS

As used herein, the term "apparatus" refers to but is not limited to at least one of a furnace tube, a tube fitting, a reaction vessel, and a radiant tube, used in petrochemical processes.

As used herein the term "hydrocarbon cracking" refers to but is not limited to processes in which hydrocarbons such as ethane, propane, butane, heptane, liquid petroleum gas, naphtha, and gas oil are cracked in apparatuses, in the presence of from about 30 weight percentage to 70 weight percentage of steam, at temperatures of from about 700° C. to about 870° C. in order to produce light olefins such as ethylene and propylene. Sometimes, hydrocarbons such as bottoms from atmospheric and vacuum distillation of crude oil are cracked in apparatuses at a temperature in a range from about 480° C. to about 600° C. in the presence of about 1 wt % to about 2 wt % steam.

As used herein the term "coke" refers to but is not limited to carbonaceous solid or liquid or particulates or macromolecules forming the carbonaceous solid or liquid, which are derived from coal, petroleum, wood, hydrocarbons and other materials containing carbon and which include, for example, carbon black, tar, and pyrolytic coke existing in hydrocarbon cracking furnace.

As used herein the term "carnegieite-like material" refers to but is not limited to the material having a $Na_2O$ stabilized (or intercalated or rich) high-carnegieite like crystal structure, i.e., a structure with certain amount of $Na_2O$ intercalated into a cubic host lattice with group symmetry $P2_13$ or $F\bar{4}3m$.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

EXAMPLES

The following examples are included to provide additional guidance to those of ordinary skill in the art in practicing the claimed invention. Accordingly, these examples do not limit the invention as defined in the appended claims.

Kaolin was obtained from Sigma-Aldrich Corp., St. Louis, Mo. (MO), USA and used without further treatment. $NaNO_3$, $Na_2CO_3$, citric acid, triethylene glycol and ethanol were obtained from Sinopharm Chemical Reagent Co., Ltd., Shanghai, China. Carbon black (99.99% carbon content, ACE Black, AB 50) was obtained from synthetic oil and lubricant of Texas, Inc., Houston, Tex., USA. Material composition was characterized with a wave dispersive x-ray fluorescence (WD XRF) analyzer (Rigaku ZSX 100e, Rigaku Industrial Corporation, Tokyo, Japan). Crystal structure was analyzed with an X-ray diffractometer (XRD) (Bruker D8 Advance, Bniker Axs GmbH Karlsruhe, Germany).

Example 1

The carnegieite-like material $Na_4Si_2Al_2O_9$ was prepared with a typical solid reaction as follows. Kaolin (12.9 g), 10.6 g $Na_2CO_3$ and 20 g ethanol were mixed together and then ball milled at 500 revolutions per minute (rpm) for 24 hours to become paste.

The paste was dried at 80° C. to obtain powder. The powder was calcinated at 850° C. for 6 hours with a temperature increasing rate of 5° C./minute.

After calcination, the powder was analyzed using both the WD XRF analyzer and the XRD. Please refer to WD XRF results in table 1, the composition ratio of this material was Na:Si:Al=2:1:1. The XRD analysis identified the $Na_2O$-stabilized (or intercalated or rich) high carnegieite like phase of $Na_4Si_2Al_2O_9$ powder.

TABLE 1

| | element | | |
|---|---|---|---|
| | Na | Si | Al |
| amount (mol) | 1.00 | 0.50 ± 0.01 | 0.50 ± 0.01 |

Example 2

$Na_4Si_2Al_2O_9$ powders (300 mg) obtained in example 1 were ground in an agate mortar and then thoroughly mixed with carbon black powder (30 mg) (weight ratio 10:1) to be used as sample 1. Carbon black powder (30 mg) was used as sample 2. Each of the samples 1 and 2 was placed in a quartz crucible, which was then hung vertically in the reaction area of a thermogravimetric analyser (TGA) furnace (TG 151, from Cahn Instruments, Inc., Cerritos, Calif., USA). A constant flow of helium passed through a preheating furnace at 700° C. and carried 50 wt % of distilled water steam to enter the TGA furnace. The temperature in the TGA furnace was increased linearly at a rate of 10° C./minute from 25° C. and held at a constant temperature of 400° C. until the balance disturbance arising from steam was eliminated and a steady weight recording was achieved. Temperature then continued to increase to 950° C. at a programmed temperature rise of 5° C./minute.

Figure 1:
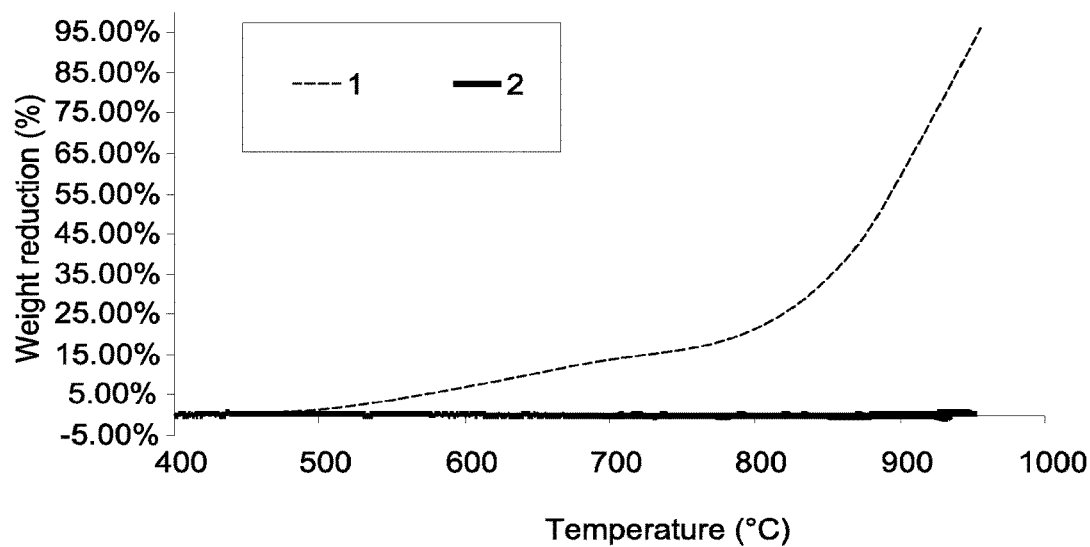
Figure 2:
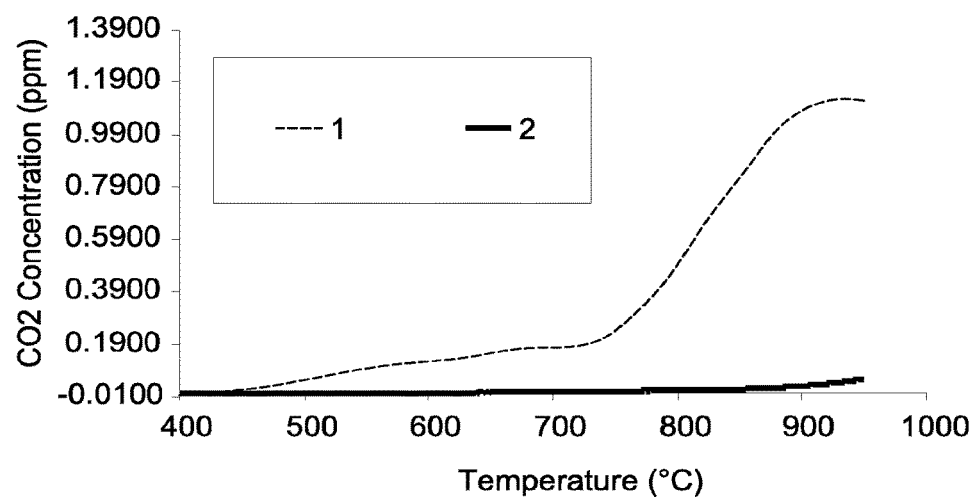
FIG. 2 shows the concentration of carbon dioxide generated after the sample 1 and the sample 2 were exposed to the helium-steam mixture at different temperatures.

The weights of the samples were recorded at different temperatures after a steady weight recording was achieved. The weight reduction percentages of carbon black in the samples during the experiment were calculated out and are shown in FIG. 1. In FIG. 1, broken line 1 represents weight reduction percentages of carbon black in the sample 1 at different temperatures while solid line 2 represents weight reduction percentages of carbon black in the sample 2 at different temperatures. Gases from the TGA furnace passed through a chiller and desiccation vessel (packed with $CaCl_2$) connected to a gas cell mounted in a Fourier Transform Infrared (FT-IR) spectrometer (Nicolet™ 380 FT-IR spectrometer from Thermo Electron Scientific Instruments Corp., Madison, Wis., USA). The concentrations of carbon dioxide in the gases obtained through the FT-IR spectrometer at different temperatures are shown in FIG. 2. In FIG. 2, broken line 1 represents concentrations of carbon dioxide generated from sample 1 at different temperatures while solid line 2 represents concentrations of carbon dioxide generated from sample 2 at different temperatures.

As shown in FIG. 1, weight reduction percentages of carbon black in the sample 1 ($Na_4Si_2Al_2O_9$-carbon black mixture) rise with the increase of temperatures, especially in the temperature range from about 500° C. to about 950° C. However, weight reduction percentages of carbon black in the sample 2 remain at approximately 0 during the experiment. As shown in FIG. 2, concentration of carbon dioxide generated from the sample 1, in the temperature range of the experiment of 400° C. to 950° C., especially from about 450° C. to about 950° C., when exposed in the helium-steam mixture, rise with the increase of temperatures, while concentration of carbon dioxide venerated from the sample 2 remains at approximately 0 during the experiment. FIGS. 1 and 2 show that carbon black weight reduction and carbon dioxide concentration of the sample 1 increased dramatically with the rise of temperature in the range of from about 750° C. to about 950° C.

This experiment suggests that the $Na_2O$-stabilized (or intercalated or rich) high carnegieite like $Na_4Si_2Al_2O_9$ is effective for catalyzing the reaction between carbon and steam in the temperature range of 400° C. to 950° C., especially from about 450° C. to about 950° C., to convert carbon into carbon oxide, and is especially effective in the temperature range of from about 750° C. to about 950° C.

Example 3

Two disks of 1 mm thickness and 10 mm diameter pressed from $Na_2O$-stabilized (or intercalated or rich) high carnegieite like $Na_4Si_2Al_2O_9$ powders obtained in example 1 and one piece of $Al_2O_3$ pellet (5 mm×5 mm×1 mm) were used as samples and stayed in a lab scale cracking furnace filled with heptane/steam mixture (weight ratio: 1:1) at 800° C.+/− 5° C. for 8 hours. The residence time of the heptane/steam mixture in the cracking furnace was 1.5 seconds. No coke deposit was observed on surfaces of the two $Na_4Si_2Al_2O_9$ disks, while coke deposits were observed on the $Al_2O_3$ pellet. This experiment suggests that the $Na_2O$-stabilized (or intercalated or rich) high carnegieite like $Na_4Si_7Al_2O_9$ may be used for hydrocarbon cracking where coke deposits are undersirable.

The XRD results of the $Na_4Si_2Al_2O_9$ disks before and after the experiment demonstrated that this $Na_2O$-stabilized (or intercalated or rich) high carnegieite like material was rather stable during the experiment.

Example 4

A coupon made from alloy 310S (composition of which is shown in table 2) with the dimension of 10×30×1 $mm^3$ was used as the substrate. Before coating, the substrate was cleaned carefully as follows: ultrasonic agitation in acetone and ethanol for 30 minutes, respectively, to remove organic contaminants, ultrasonic agitation in HCl (3.3 wt %) for 30 minutes to etch the substrate surface, ultrasonically rinsing in deionized water, and finally dried completely by compressed air.

TABLE 2

| | Cr (wt %) | Ni (wt %) | Fe (wt %) | Mn (wt %) | Si (wt %) | S (wt %) | P (wt %) | Cu (wt %) | Mo (wt %) | Al (wt %) | Ti (wt %) | C (wt %) |
|---|---|---|---|---|---|---|---|---|---|---|---|---|
| 310S | 25.6 | 18.9 | 52 | 1.6 | 0.4 | — | — | — | — | — | — | 1.5 |

$Na_2O$-stabilized (or intercalated or rich) high carnegieite like $Na_4Si_2Al_2O_9$ powders (2 g) obtained in example 1 were ball milled to powders with average particle size of 1.7 um and were mixed with 2.5 g deionized water. Glycerol (0.4 g) was added into the mixture. Then the mixture was blended with high-speed mixer (Speedmixer™ DAC 150FVC, Flacktek Inc., Landrum, S.C., USA) at 4000 rpm for 1 minute and became slurry. Dipped the alloy substrate into the slurry to cover the coupon surface to be coated with the slurry. Dried the coupon in air for 2 hours and then calcined it at 800° C. in argon atmosphere for 2 hours. XRD results identified the $Na_2O$-stabilized (or intercalated or rich) high carnegieite like phase of $Na_4Si_2Al_2O_9$ in the film on the alloy substrate.

Example 4

The coated alloy coupon obtained in example 3 was then used as a sample and stayed in the cracking furnace at 860° C. for 5 hours in the heptane/steam (1:1 weight ratio) mixture. The residence time of the heptanelsteam mixture in the cracking furnace was 1.5 seconds. No coke deposit was observed on the $Na_4Si_2Al_2O_9$ film after the experiment.

Energy disperse spectroscopy (EDS, Inca X-sight, Oxford Instruments, Oxfordshire, UK) analysis was performed after the experiment and confirmed that no carbon can be identified on the surface of the $Na_4Si_2Al_2O_9$ film. However, coke deposits were observed on the blank section of the alloy substrate without the $Na_4Si_2Al_2O_9$ film. This experiment suggests that the $Na_4Si_2Al_2O_9$ film is effective for eliminating coke deposits when the heptane was cracked in the presence of steam.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus for hydrocarbon-cracking having a contact surface accessible to at least one hydrocarbon, the contact surface comprising a material of formula $(Na_2O)_x Na_2[Al_2Si_2O_8]$ with carnegieite structure, wherein $0<x\leq1$.

2. The apparatus of claim 1, wherein the material is of formula $(Na_2O)Na_2[Al_2Si_2O_8]$.

3. The apparatus of claim 1, wherein the material is coated to the contact surface.

4. The apparatus of claim 1, comprising at least one of a furnace tube, a tube fitting, a reaction vessel, and a radiant tube.

5. The apparatus of claim 1, wherein the contact surface comprises a coating of the material, and the material is of formula $(Na_2O)Na_2[Al_2Si_2O_8]$.

6. The apparatus of claim 1, wherein the material is a mixture of materials of formula $(Na_2O)_x Na_2[Al_2Si_2O_8]$.

* * * * *